United States Patent
Schaafsma

(10) Patent No.: US 8,845,775 B2
(45) Date of Patent: Sep. 30, 2014

(54) FERTILIZER COATING

(75) Inventor: Stefan Hendrikus Schaafsma, Susteren (NL)

(73) Assignee: Stamicarbon B.V., Sittard (NL)

( * ) Notice: Subject to any disclaimer, the term of this patent is extended or adjusted under 35 U.S.C. 154(b) by 70 days.

(21) Appl. No.: 13/497,783

(22) PCT Filed: Sep. 28, 2010

(86) PCT No.: PCT/NL2010/050632
§ 371 (c)(1),
(2), (4) Date: Nov. 16, 2012

(87) PCT Pub. No.: WO2011/037469
PCT Pub. Date: Mar. 31, 2011

(65) Prior Publication Data
US 2013/0055776 A1 Mar. 7, 2013

(30) Foreign Application Priority Data
Sep. 28, 2009 (EP) .................................... 09171518

(51) Int. Cl.
| | |
|---|---|
| A23L 1/00 | (2006.01) |
| C09D 4/00 | (2006.01) |
| C05C 9/00 | (2006.01) |
| C05B 7/00 | (2006.01) |
| C05B 1/02 | (2006.01) |
| C05B 21/00 | (2006.01) |
| C05B 17/00 | (2006.01) |
| C05C 1/00 | (2006.01) |
| C05C 5/00 | (2006.01) |
| C05C 5/04 | (2006.01) |
| C05D 1/00 | (2006.01) |
| C05C 3/00 | (2006.01) |
| C05G 3/00 | (2006.01) |
| A23K 1/00 | (2006.01) |
| A23K 1/16 | (2006.01) |

(52) U.S. Cl.
CPC ............ *C05G 3/0029* (2013.01); *C05G 3/0041* (2013.01); *A23K 1/004* (2013.01); *A23K 1/164* (2013.01)
USPC ........... 71/64.07; 71/28; 71/29; 71/30; 71/33; 71/34; 71/48; 71/50; 71/51; 71/53; 71/58; 71/60; 71/61; 71/63; 71/64.02; 106/243; 106/244; 106/245; 106/268; 426/96; 426/97

(58) Field of Classification Search
USPC ........ 71/64.07, 28, 29, 30, 33, 34, 48, 50, 51, 71/53, 58, 60, 61, 63, 64.02; 426/96, 97; 106/243, 244, 245, 268
See application file for complete search history.

(56) References Cited

U.S. PATENT DOCUMENTS

| | | | |
|---|---|---|---|
| 3,321,298 A | 5/1967 | Bidlack, Sr. et al. | |
| 4,880,455 A | 11/1989 | Blank | |
| 5,230,913 A * | 7/1993 | Klemann | 426/97 |
| 6,391,454 B1 | 5/2002 | Mao et al. | |
| 8,236,086 B2 | 8/2012 | Janssen et al. | |
| 2002/0144528 A1 | 10/2002 | Ma et al. | |

FOREIGN PATENT DOCUMENTS

| | | |
|---|---|---|
| CN | 101484404 | 7/2009 |
| GB | 2 202 523 | 9/1988 |
| WO | WO-02/081410 | 10/2002 |
| WO | WO-2009/074679 | 6/2009 |

OTHER PUBLICATIONS

International Search Report for PCT/NL2010/050632, mailed Feb. 25, 2011, 3 pages.

* cited by examiner

*Primary Examiner* — Wayne Langel
(74) *Attorney, Agent, or Firm* — Morrison & Foerster LLP

(57) ABSTRACT

This invention relates to a coating composition for a fertilizer comprising at least 50 wt % of a cross-linked lipid; and less than 0.20 wt %, relative to the total weight of the lipid, of a catalyst for cross-linking an unsaturated lipid. The cross-linked lipid has a viscosity at 20 degree Celsius (° C.) in the range of 110 and 800 mPa·s.

15 Claims, No Drawings

FERTILIZER COATING

CROSS-REFERENCE TO RELATED APPLICATIONS

This application is the national phase of PCT application PCT/NL2010/050632 having an international filing date of 28 Sep. 2010, which claims benefit of European patent application No. 09171518.5 filed 28 Sep. 2009. The contents of the above patent applications are incorporated by reference herein in their entirety.

The invention relates to a coating for fertilizers and animal feed and in particular biodegradable coatings which exhibit good anti-caking properties.

Various fertilizers are known and also various agents to coat the particles thereof. Fertilizers and coatings for fertilizers are for instance described in Ullmann's Encyclopedia of Industrial Chemistry, 2002 in the chapter about Fertilizer Granulation. According to this publication a coating is applied to a fertilizer to promote the maintenance of good physical conditions, like the flowability, during storage and handling. Caking is the agglomeration of fertilizer particles by adhesion at their point of contact to form a compact mass that is difficult to break up. Caking has a negative influence on the flowability of a fertilizer.

A disadvantage of the known coating agents for fertilizers is that, after the field application of the fertilizer, the coating agents stay in the soil and accumulate. Therefore, the known coating agents are harmful for the environment. Another disadvantage of conventional coatings is that they often contain highly purified and processed compounds, many of which are synthetic, which possess a high carbon footprint and thus are environmentally unsustainable.

These deficiencies were addressed in WO2008/000492 and WO2009/074679 which disclosed the use of a fertilizer coating comprising a biodegradable oil and biomass. While these coatings presented a significant improvement in terms of biodegradability, there is still scope for improvement in anti-caking performance, especially over prolonged periods of storage (e.g. several weeks or months under warm and humid conditions).

The present invention addresses at least some of the above-mentioned problems, through providing a coating composition, preferably for a fertilizer, comprising:
 a. at least 50 wt % of a cross-linked lipid; and
 b. less than 0.20 wt %, relative to the total weight of the lipid, of a catalyst for cross-linking an unsaturated lipid,
wherein the cross-linked lipid has a viscosity at 20 degree Celsius (° C.) in the range of 110 and 800 mPa·sec.

It has been unexpectedly found that the coating composition of the present invention has improved long term anti-caking tendencies compared to conventional biodegradable coating compositions.

Preferably, the coating composition comprises between 0 and 40 wt % biomass with the median particle size ($D_{50}$) between 0 and 250 μm. The addition of biomass has been found to further enhance the long term anti-caking properties of the coating formulation.

Preferably, the coating composition comprises at least 60 wt %, more preferably at least 70 wt %, even more preferably at least 80 wt % and most preferably at least 90 wt % of a cross-linked lipid.

The cross-linked lipid preferably has a viscosity at 20° C. of at least 120 mPa·s., more preferably at least 150 mPa·s., even more preferably at least 170 mPa·sec. and most preferably at least 200 mPa·s. Cross-linked lipids with a lower viscosity at 20° C. have been found to have inferior anti-caking properties after storage over a prolonged period (e.g. 30 days).

The cross-linked lipid preferably has a viscosity at 20° C. of at no more than 800 mPa·s., more preferably no more than 600 mPa·s., even more preferably no more than 500 mPa·sec. and most preferably no more than 400 mPa·s. Cross-linked lipids with a higher viscosity at 20° C. are more difficult to handle and apply to particulates, such as fertilizer particulates.

The level of catalyst in the coating composition is preferably less than 0.15 wt %, more preferably less than 0.10 wt %, even more preferably less than 0.05 wt % and most preferably less than 0.02 wt % relative to the weight of the lipid. The catalyst will be detectable in the coating composition and thus its content will be greater than 0.00 wt %. In general, the lower the level of catalyst in the coating composition, the more environmentally friendly it is.

In another aspect of the present invention, there is provided fertilizer or animal feed particulate comprising the coating composition of the present invention. Preferably the coating composition represents at least 0.01 weight %, more preferably at least 0.05 wt %, even more preferably least 0.10 wt % and most preferably at least 0.15 wt % relative to the total weight of the particulate. At lower levels, the coating composition does not significantly affect the anti-caking properties of the particulates.

Preferably, the coating composition represents no more than 1.0 wt %, more preferably no more than 0.8 wt %, even more preferably no more than 0.6 wt % and most preferably no more than 0.4 wt % relative to the total weight of the particulate. Anti-caking performance is not further improved with a higher proportion of the coating composition.

In a further aspect of the present invention there is provided a process for coating a particulate comprising the steps of:
 a. forming a coating composition by cross-linking an unsaturated lipid in the present of a catalyst until the viscosity of the cross-linked lipid at 20° C. is in the range 110 to 800 mPa·s; and
 b. applying the coating composition to the particulate, wherein the coating composition comprises and/or is derived from at least 50 wt % unsaturated lipid.

Preferably, the coating composition comprises or is derived from at least 60 wt %, more preferably at least 70 wt %, even more preferably at least 80 wt % and most preferably at least 90 wt % of unsaturated lipid relative to the total weight of the coating composition.

The cross-linking of the unsaturated lipid preferably results in an increase in the viscosity of the resulting coating composition relative to the pre-cross linked coating composition of at least 20%, more preferably at least 50% and most preferably at least 100%.

A fundamental difference of the process for coating a particulate as defined in the present invention, compared to conventional processes, is that the cross-linking of the lipid is carried out as a pretreatment step prior the application of the coating. This has a number of benefits.

In conventional coating processes, the cross-linking reaction is carried out during the application of the coating to the particulate, thereby necessitating a relatively quick reaction time. As a quick reaction time (e.g. less than 30 minutes) is not required in the present invention, the quantity of the catalyst may be minimized, thereby enabling the amount of less environmentally friendly catalysts to be reduced or eliminated. Alternatively or in addition to, less active, but more environmentally friendly catalysts (e.g. an iron based or enzymatic catalyst), may be used without compromising the economic feasibility of the process.

Preferably, the cross-linking reaction takes place at an ambient temperature (e.g. about 23° C.) in air over a period of at least 2 hours, more preferably at least 12 hours, even more preferably at least 24 hours, and most preferably at least 48 hours. There is no required upper limit, although for practical reasons, reaction times at preferably less than 2 weeks and more preferably less than 1 week.

Preferably prior to step (b), a preceding step is included which substantially terminates the cross-linking or chain extending reaction of step (a), once the desired viscosity is reached, to thereby produce a coating composition.

Substantial termination of the cross-linking reaction is to be given a purposive construction, with residual cross-linking reaction due to residual catalyst activity or through non-catalytic reaction encompassed within the meaning of substantial termination. Preferably, substantial termination of the cross-linking reactions results in no more than a 50% increase in viscosity at 20° C. of the coating composition being saturated in air at ambient temperature (e.g. about 23° C.) for 48 hours. More preferably the increase in viscosity is no more than 30%, even more preferably no more than 20%, and most preferably no more than 10%. The lower the change in viscosity, the greater the ability of the coating composition to be stored prior to application without significant changes in viscosity. This results in a product with a more consistent viscosity enables more efficient and effective application of the coating to the particulates.

The termination of the cross-linking reaction may be carried out by any suitable method. In one embodiment, the termination of the cross-linking reaction is carried out through the substantial removal of the catalyst. To assist in the removal of the catalyst from the coating composition, the catalyst system is preferably a heterogenous catalyst system (e.g. a solid catalyst and liquid reactant).

In another embodiment, the cross-linking reaction is substantially terminated through the addition of a catalyst deactivating agent.

A cross-linking reaction, for the purposes of the present inventions, is inclusive of chain extending reactions.

Environmentally friendly means that, from a life cycle analysis, the process or product uses fewer resources (energy and/or materials) or releases fewer harmful substances compared to most, if not all, conventional processes or products.

Unless otherwise indicated, all weights are determined on a dry weight basis.

Unless otherwise indicated, amounts are in wt % relative to the total weight of the coating composition.

Unless otherwise stated all references herein are hereby incorporated by reference.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

Coating Composition

Preferably, the coating composition comprises between 0 and 40 wt % biomass and more preferably between 10 and 30 wt % biomass. Preferably the coating composition comprises between 50 and 90 wt % and more preferably between 60 to 85 wt. % cross-linked lipids, as defined within the scope of the present invention. In one embodiment, the coating essentially consists of the cross-linked lipids.

Lipids

The unsaturated lipids preferably comprise an unsaturated fatty acyl and more preferably comprise an ester of glycerol, such as a natural fat or oil (e.g. vegetable or animal derived fats and oils). Preferably, the lipids comprise unsaturated fatty acids having between 12 and 20 carbons. In a special embodiment, the lipids comprise unsaturated fatty acids derived as a byproduct of bio-diesel production.

The degree of unsaturation of the lipids, as measured by the iodine value (determined in accordance with ASTM $D_{5768}$-02 (2006)) is preferably at least 60, more preferably at least 70, even more preferably at least 80, yet even more preferably at least 90 and most preferably at least 100. The higher iodine value, the greater degree of unsaturation (i.e unsaturated bonds) in the lipids and therefore the greater the propensity of the lipids to cross-link.

While lipids with high iodine values (IV), such as linseed (IV=178) or Tung oil (IV=168) possess greater cross-linking activity, as the application of the coating composition occurs after the cross-linking reaction has been substantially completed, the use of such high IV oils is not essential for the working of the invention. Indeed, the use of a pretreatment step to cross-link the lipids, enables a diverse source of lipids containing compositions to be used under the scope of the present invention. To this effect, in one embodiment, the iodine value is less than 120 (e.g. canola oil).

Catalyst

Any suitable known catalyst which cross-links the unsaturated lipid may be used. Preferably the catalyst is selected from the group consisting of peroxides, azo, preferably diazo, compounds and inorganic and organometallic compounds. Preferred inorganic and organometallic catalysts preferably comprise manganese, lead, zinc, iron, zirconium, calcium, potassium, zinc, vanadium, cobalt and combinations thereof. More preferably, the catalyst comprises iron. The organometallic compounds are preferably naphthenates, carboxylate, octoates, oleates, linoleates, and resinates.

To enable a comparison between the different catalyst systems, the quantity of catalyst is expressed in relation to the active component (e.g. the metal component, such as cobalt, rather than the organometallic component which it may form part of). In some embodiments the catalyst is a heterogeneous catalyst.

In embodiments in which the catalyst is removed prior to the application of the coating composition onto the particulates, the catalyst is preferably a solid catalyst. More preferably, the catalyst is supported on an inert support material (e.g. silica). The solid catalyst may be in the form of free particulates, in which case the removal of the catalyst is performing using conventional solid liquid separation techniques, such as a filtration operation. Alternatively, the solid catalyst may form a fixed bed in a reaction vessel. In this embodiment, the unsaturated lipids are circulated around the reaction vessel for the required length of time before being removed from the reaction vessel.

While the activity of the catalyst in a solid form may be less compared to liquid catalysts, the ability to reuse the solid catalyst enhances its environmentally friendly characteristics.

Catalyst Deactivating Agent

Any suitable catalyst deactivating agent which substantially terminates the cross-linking reaction may be used. Preferably, the catalyst deactivating agent performs a dual function within the coating composition, such to minimize the complexity and environmental footprint of the coating composition.

In an exemplary embodiment of the present invention, the catalyst comprises a metal selected from the group consisting of manganese, lead, zinc, iron, zirconium, calcium, potassium, zinc, vanadium and/or cobalt and the deactivating agent comprises an amine. The specific amine may be readily determined by those skilled in the art. Preferably, the catalyst deactivating agent comprises an alkyl substituted amine and more preferably a fatty acid amine. Fatty acid amine may be also used in the coating composition to promote the adhesion of inert inorganic fillers to the particulate, such as talc or bentonite.

Other catalyst deactivating agents include sodium or potassium hydroxide and other strong bases.

In an alternative embodiment, the catalyst deactivating agent is an inert atmosphere (i.e. substantially free of oxygen) which prevents the progression of the cross linking reaction (e.g. nitrogen or carbon dioxide) prior to application to the coating onto the particulates.

Biomass

The biomass particles are preferably plant derived solid particles, which are preferably oilseed meal, although small particles of any plant or vegetable source (e.g. grains) may be suitable, including fibres, saw dust, scrap meal or flour, such as flour of wheat, barley, legumes, wood dust, coconut or alfalfa. The oilseed meal is preferably derived from the same oilseeds used to derive the oil component of the biomass composition, such that the coating biomass composition may be produced within the same oilseed processing facility, thus reducing transport and storage costs.

The oilseeds meal is typically high in protein (about 10 to 30 wt %) and thus this source of biomass not only degrades into the environment, but may also contribute to the efficacy of the fertilizer (although any contribution will be relatively small). Similarly, when the biomass composition is used to coat animal feed, the plant derived oil contributes to the energy value of the animal feed, while the plant derived solid particles contribute to the protein content of the animal feed.

Preferably, the biomass solid particles are rigid, such that the particles may be ground into the target particle size distribution. Preferably, the oilseed meal is substantially free of husks or other fibrous material which may be difficult to grind to the target particle size range. Ground de-hulled rapeseed has been found to be particularly effective within the scope of the present invention. Additionally, the biomass solid particles should have a relatively low moisture and moisture uptake rate. For example the initial moisture of the biomass solid particles (at 25° C. and 50% relative humidity) are preferably less than 30 wt. %, more preferably less than 20 wt %, even more preferably less than 12 wt % and most preferably less than 5 wt %. Biomass derived from grains and/or legumes generally conform to the requirements of good mechanical and moisture absorption properties and, as such, are preferred compared to biomass derived from yeast or fungi which have less suitable mechanical and water absorption properties.

The biomass solids content, such as plant derived solid particles may be measured by their hexane insoluble content which therefore excludes oil and other hexane soluble material such as phospholipids. Alternatively, biomass solid contents may be derived by difference, after the oil (hexane soluble) and moisture (analyzed by Karl Fischer technique) components are calculated. The solids are preferably non-elastic such to enable efficient and effective grinding of the biomass to the desired particle size range. The de-oiled oilseed meal typically contains 1 to 15 wt % residual oil and 5 to 15 wt % moisture relative to the total weight of the de-oiled oilseeds, depending upon the oil extraction means used. The determined % wt oil will be inclusive of other hexane soluble material such as waxes and phospholipids. Separate analysis of these oil miscible components may be performed using standard industry techniques. Standard industry techniques include those published by the American Oil Chemist's Society (AOCS).

The solid biomass particles may also be sourced from:
1. biomass of yeast cells, bacteria cells or fungi cells, and/or
2. waste water sludge resulting from the treatment of organic and/or biologic waste.

The solid biomass particles of the first group can, for instance, be either the microorganisms as such or the fraction of yeast cells, bacteria cells and/or fungi cells which is insoluble in water and which is obtained by opening of yeast cells, bacteria cells and/or fungi cells by a physical, mechanical, chemical or enzymatic method (or a combination of two or more of these methods) with consequent release of the content of the yeast cells, bacteria cells or fungi cells and by recovering the insoluble fraction. The microorganisms are preferably biologically inert.

Further details regarding suitable biomass particles may be found in WO2008/000492 and WO2009/074679.

Other Components

The coating composition may comprise other components, such as waxes, fatty amines, paraffines, sulfonates, aldehydes or urea-aldehyde resins.

Inert inorganic fillers such as talcum, lime, kaolin and kieselguhr are preferably applied to the coated particulates to enhance handling properties. The proportion of inert fillers is preferably between 0 and 2 wt % and more preferably between 0.2 and 1.0 wt % relative to the total weight of the coated particulate and inert filler. The particle size distribution of the inert filler, such that the $D_{50}$ is between 5 and 100 microns and more preferably between 10 and 40 micron. Most preferably, no inorganic fillers are added to the coating composition.

Coated Fertilizer and Animal Feed

A fertilizer that is suitable to be coated with the coating composition is any solid fertilizer comprising particles with a diameter of 0.5-50 mm; preferably with a diameter of 1-5 mm.

Examples of fertilizers are calcium nitrate, ammonium nitrate, calcium ammonium nitrate (CAN), ammonium sulfate nitrate, ammonium sulfate, urea, superphosphate, triple superphosphate, monoammonium phosphate, diammonium phosphate, ammonium polyphosphate, nitrophosphate, potash, potassium phosphate, potassium nitrophosphate, NPK fertilizers and combinations of these fertilizers. These fertilizers can be produced by granulation, prilling and flaking.

Preferably, the fertilizer is granular urea or calcium ammonium nitrate (CAN), because these fertilizers are produced and utilized in large quantities and caking during storage and transport is, for these fertilizers, a big problem.

The animal feed includes granules and pellets and other particulate forms of animal feed, which are used and known within the commercial livestock industry. The granules and pellets have a typical diameter of 1 to 50 mm; and in particular 2 to 20 mm.

The coated fertilizer or animal feed can be produced by addition (e.g. by spraying or dripping) of the coating composition on the particulates in, for instance, a pan granulator, a rotating drum or a fluid bed apparatus. Preferably, the coating composition is applied as a single layer.

The coating is applied to the fertilizer via conventional techniques, such as spraying the biomass composition on the fertilizer (or animal feed) particles in rotating drum or coating pan.

The coating preferably has a moisture content of less than 5 wt % relative to the total weight of the coating composition. More preferably the moisture content is less than 3 wt % and even more preferably less than 1 wt % relative to the total weight of the coating composition. Preferably, the majority of the water is stabilized, such that it is not available to be transferred between coated particles. For example, the moisture may be bound within the solid biomass or contained by a hydrophobic oil or wax barrier.

It is also possible to use certain types of the coated fertilizer according to the invention, for instance coated urea particles, as cattle feed instead of as a fertilizer.

In a special embodiment, there is provided a coating composition for a fertilizer comprising:

a. at least 50 wt % of a cross-linked lipid; and
b. less than 0.20 wt %, relative to the total weight of the lipid, of a catalyst for cross-linking an unsaturated lipid;
c. 0 and 40 wt % biomass particles with a $D_{50}$ between 0 and 250 μm; and
d. a catalyst deactivator for inhibiting the cross-linking of an unsaturated lipid, wherein the cross-linked lipid has a viscosity at 20 degree Celsius (° C.) in the range of 110 and 800 mPa·s, wherein
   the catalyst comprises a metal selected from the group consisting of manganese, lead, zinc, iron, zirconium, calcium, potassium, zinc, vanadium, cobalt and combinations thereof;
   the biomass is selected from the group consisting of plant derived solid particles, grain and legume particulates, oilseed meal, plant derived fibres, wood saw dust, scrap meal or flour derived from wheat, barley, or legumes, yeast cells, bacteria cells or fungi cells, waste water sludge resulting from the treatment of organic or biologic waste and combinations thereof;
   the cross linked lipid is derivable from the group consisting of unsaturated fatty acyl, an ester of glycerol, a natural fat or oil, canola oil, soya bean oil, sunflower oil, palm oil, vegetable or animal derived fats and oils, fatty acids and combinations thereof; and
   the catalyst deactivator is selected from the group consisting of alkyl substituted amine, a fatty acid amine, a strong base, sodium or potassium hydroxide, an inert oxygen free atmosphere and combinations thereof.

Preferably, the coated particulates of the present invention have a caking tendency of less than 0.08 MPa, more preferably less than 0.05 MPa and even more preferably less than 0.025 MPa after 15 days storage using the methodology described in the examples.

EXAMPLES

Methodology

Determination of and $D_{50}$ and $D_{90}$
The particle size of the biomass was determined according to ISO 13320-1.
The particle size distribution of the fertilizer or animal feed was determined according to ISO-DIS 8397 and ISO 565.
The $D_{50}$ is the theoretical sieve opening, having such a mesh size that 50 wt % of the fertilizer or animal feed particles is larger and 50 wt % of the fertilizer or animal feed particles is smaller than this mesh size. The $D_{90}$ is determined in an analogous way.

Determination of Viscosity
Viscosity was determined using a Paar Physica MCR 300 rheometer with a CC27 measuring geometry. Measurements were performed at 20 degrees Celsius (° C.) and 50° C. after the sample was maintained at a shear rate of 100 sec$^{-1}$ for 15 minutes at each temperature.

Determination of Caking Tendency
The caking test was performed as follows:
   a cylindrical sample holder is filled with 100-200 g of material. The sample holder is made of a flexible natural rubber membrane;
   the sample holder is closed with a lid that is attached to the flexible membrane;
   the sample holder is put upside down and is placed in a pressure chamber;
   because of the flexible membrane pressure can be applied on the sample by applying an overpressure in the chamber the sample is compressed;
   the sample is stored at room temperature for between 1 and 30 days at an overpressure of 0.1 MPa;
   after storage the overpressure was released and, within 24 hours, the caked samples are broken by means of a tensile/consolidating bench. This is done by lowering a piston on the sample holder and recording the stress needed to break the sample. The maximum value recorded is the caking tendency expressed in MPa (i.e. the maximum force divided by the top surface of the sample holder with a diameter of 40 mm).
   The value for the caking tendency preferably is below 0.08 MPa, more preferably below 0.05 MPa and most preferably below 0.025 MPa.

Acid value was determined in accordance with Test method: AOCS Cd3a-63

Product List

Fertilizer
   Calcium Ammonium Nitrate (CAN 27, Nutramon) a standard nitrogen fertilizer of DSM Agro, the Netherlands with a $D_{50}$ of 3.6 mm.

Biomass
   Wheat flour (flour) having a $D_{50}$ of 19 μm and a $D_{90}$ of 30 μm and a moisture content of about 10 wt % relative to the total weight of the wheat flour.
   Saw dust having a $D_{50}$ of 40 μm and a $D_{90}$ of 90 μm and a moisture content of about 10 wt % relative to the total weight of the saw dust.

Lipid
   Refined and deodorized (R&D) canola oil having an acid value of 0.22 mg KOH/g and an IV value of 110. R&D canola oil is widely available in supermarkets.

Catalyst
   Cobalt Carboxylate available under the tradename Nuodex™ Cobalt 8 (8 wt % cobalt solution), available from Miracema-Nuodex Industria Quimica Ltda.

Talcum
    Talcum Luzenac 2S of Talc de Luzenac with a D50 particle size of about 17 μm.
Additive
    Fatty acid amine Genamin™ SH100, available from Clariant, Germany.
Milling and Homogenizing Equipment
    Pinn mill: Pallman PXL 18 (P)
    Rotor-stator mixer: Ultraturrax of IKA Labortechnik, type T50 with standard dispersing tool GM (U)
Preparation of the Coated Fertilizer
Pretreatment of the Unsaturated Lipid
    In respect to examples 1 to 3, the canola oil and catalyst (0.12 wt % of Nuodex™ Cobalt 8 relative to the total weight of the coating composition, which equates to 0.01 wt %, 0.015 wt % and 0.13 wt % cobalt (i.e. catalyst component) relative to the weight of the oil, for examples 1 to 3 respectively) are combined, saturated with air and stirred at ambient temperature for 48 hours. During the cross-linking reaction, the viscosity at 20° C. of the cross-linked canola oil had risen from 68 to 172 mPa·sec (Table 2).
    In comparative experiment A, the canola oil, catalyst, fatty acid amine and biomass were combined, saturated with air and stirred at ambient temperature for 48 hours. As indicated in Table 2, the addition of the fatty amine to the catalyst resulted in the deactivation of the catalyst (thereby preventing substantial cross-linking of the coating), as indicated by a reduced increase in viscosity at 20° C. of the canola oil.
    Advantageously, the effect of cross-linking on viscosity is less at 50° C., with a small difference in viscosity observed between the reacted (catalyst), unreacted (no catalyst) and deactivated (catalyst+catalyst deactivating agent) compositions. This effect enables the cross-linked oil to be conveniently applied at substantially the same temperature as conventional coating compositions.
Substantial Termination of the Cross-Linking Reaction
    In examples 1 to 3, fatty acid amine (4.4 wt % relative to the total weight of the composition) was dissolved in the cross-linked canola oil at 50° C. to thereby deactivate the catalyst. In examples 2 and 3, 16 and 30 wt % biomass, relative to the total weight of the coating composition, respectively was also added. These components were mixed using a pin mill and a rotor-stator mixer to prepare the coating composition.
Applying the Coating Composition to the Particulates
    Immediately prior to application to the fertilizer particulates, the coating composition was heated to about 80° C. The coating composition was then sprayed onto 1.5 kg of fertilizer particles that were kept moving in a rotating drum (35 rpm, diameter 25 cm, length 15 cm) at a temperature of 35° C. The coating composition represented 0.18 wt % of the total weight of the coated fertilizer.
    About two minutes after addition of the coating composition to the fertilizer particles, 0.5 wt % talcum, relative to total weight of the coated fertilizer and talc, was added. Thereafter, the fertilizer was rotated for two more minutes. The fertilizer particles were then released from the rotating drum and stored for a minimum of 24 hours to cool down to ambient temperature.

RESULTS

As illustrated from Table 1, the coating compositions exhibited good anti-caking properties over a 30 day storage period compared to composition in which insufficient cross-linking had occurred (comparative experiment A), or in which no coating was applied (comparative experiment B), or in which no catalyst was applied (comparative experiment C).
    Anti-caking performance was particularly good for coating compositions comprising 30 wt % biomass (examples 2 & 3), in which the anti-caking performance remained substantially constant between 2 and 30 days storage.

TABLE 1

| Example | Biomass | Wt % Biomass | Catalyst (wt %) | Coating (wt %) | Caking tendency (MPa) | | | | |
| --- | --- | --- | --- | --- | --- | --- | --- | --- | --- |
| | | | | | 2 days | 7 days | 15 days | 21 days | 30 days |
| 1 | — | — | 0.010 | 0.18 | 0.010 | 0.009 | 0.011 | — | 0.045 |
| 2 | Sawdust | 16 | 0.013 | 0.18 | 0.009 | 0.008 | 0.008 | — | 0.011 |
| 3 | Flour | 30 | 0.015 | 0.18 | 0.009 | 0.008 | 0.008 | — | 0.009 |
| A | Flour | 30 | 0.015 | 0.18 | 0.009 | — | 0.082 | — | — |
| B | — | — | — | — | 0.176 | — | — | 0.305 | — |
| C | Flour | 30 | — | 0.18 | 0.11 | — | 0.62 (12 days) | — | — |

TABLE 2

| Formulation | Viscosity (mPa · s) @ 20° C. | Viscosity (mPa · s) @ 50° C. |
| --- | --- | --- |
| Oil | 68 | 20 |
| Oil + 4.4% fatty amine + 0.12 wt % Catalyst | 104 | 48 |
| Oil + 0.12 wt % Catalyst | 172 | 52 |

The invention claimed is:
1. A process for coating a fertilizer or animal feed particulate comprising the steps of:
    (a) forming a coating composition by cross-linking an unsaturated lipid in the presence of a catalyst until the viscosity of the cross-linked lipid at 20° C. is in the range of 110 to 800 mPa·s; followed by
    (b) applying the coating composition of (a) to the particulate,
    wherein the coating composition comprises and/or is derived from at least 50 wt % unsaturated lipid.
2. The process according to claim 1, further comprising the step, between steps (a) and (b) of substantially terminating the cross-linking reaction of step (a).
3. The process according to claim 1, wherein in step (a) cross-linking takes place over a period of at least 2 hours.
4. The process according to claim 2, wherein the addition of a catalyst deactivator substantially terminates the cross-linking reaction of step (a).
5. The process according to claim 4, wherein the catalyst deactivator comprises an amine group.
6. The process according to claim 1, wherein cross-linking of the unsaturated lipid results in an increase in the viscosity relative to said unsaturated lipid of at least 20%.
7. The process according to claim 1, wherein step (a) is substantially terminated by removing the catalyst.

8. A coated fertilizer or animal feed particulate obtained by the process of claim 1.

9. A composition for use in coating fertilizer or animal feed particles comprising:
  (a) at least 50 wt % of a cross-linked lipid; and
  (b) less than 0.20 wt %, relative to the total weight of the lipid, of a catalyst for cross-linking an unsaturated lipid,
  wherein the cross-linked lipid has a viscosity at 20 degree Celsius (° C.) in the range of 110 to 800 mPa·s,
  and further wherein said composition is not present on said fertilizer or said animal feed.

10. The composition according to claim 9, further comprising, relative to the total weight of the composition, between 0 and 40 wt % biomass particles with a $D_{50}$ between 0 and 250 μm.

11. The composition according to claim 9, wherein the catalyst comprises a metal selected from the group consisting of manganese, lead, zinc, iron, zirconium, calcium, potassium, zinc, vanadium, cobalt and combinations thereof.

12. The composition according to claim 9, further comprising a catalyst deactivator for inhibiting the cross-linking of an unsaturated lipid.

13. The composition according to claim 12, wherein the catalyst deactivator is a fatty amine.

14. A fertilizer or animal feed particulate coated with a coating composition which comprises:
  (a) at least 50 wt % of a cross-linked lipid; and
  (b) less than 0.20 wt %, relative to the total weight of the lipid, of a catalyst for cross-linking an unsaturated lipid,
  wherein the cross-linked lipid has a viscosity at 20 degree Celsius (° C.) in the range of 110 to 800 mPa·s.

15. The particulate according to claim 14, wherein the coating represents between 0.01 and 1.0 weight % of the total weight of the particulate.

* * * * *